United States Patent
Iyoda et al.

(10) Patent No.: US 7,033,413 B2
(45) Date of Patent: Apr. 25, 2006

(54) SOFT MAGNETIC POWDER MATERIAL, SOFT MAGNETIC GREEN COMPACT, AND MANUFACTURING METHOD FOR SOFT MAGNETIC GREEN COMPACT

(75) Inventors: Yoshiharu Iyoda, Okazaki (JP); Kota Maruyama, Toyoake (JP); Naoki Kamiya, Chiryu (JP)

(73) Assignees: Aisin Seiki Kabushiki Kaisha, Kariya (JP); Hoeganaes AB, Hoeganaes (SE)

( * ) Notice: Subject to any disclaimer, the term of this patent is extended or adjusted under 35 U.S.C. 154(b) by 174 days.

(21) Appl. No.: 10/321,377

(22) Filed: Dec. 18, 2002

(65) Prior Publication Data

US 2003/0127157 A1    Jul. 10, 2003

(30) Foreign Application Priority Data

Dec. 18, 2001    (JP) .............................. 2001-385039

(51) Int. Cl.
  *B22F 1/02*    (2006.01)
  *B22F 3/12*    (2006.01)
  *H01F 1/147*   (2006.01)

(52) U.S. Cl. ...................... 75/252; 75/231; 252/62.55; 419/10

(58) Field of Classification Search ................ 148/105, 148/306; 252/62.53, 62.55; 75/228, 252, 75/231; 419/10

See application file for complete search history.

(56) References Cited

U.S. PATENT DOCUMENTS

| | | | |
|---|---|---|---|
| 1,982,689 A | | 12/1934 | Polydoroff |
| 4,065,519 A | * | 12/1977 | Koch .......................... 264/126 |
| 5,211,896 A | * | 5/1993 | Ward et al. ................... 264/126 |
| 5,268,140 A | * | 12/1993 | Rutz et al. ...................... 75/246 |
| 5,500,564 A | * | 3/1996 | Sano et al. ..................... 310/83 |
| 5,510,412 A | * | 4/1996 | Suzuki et al. ................ 524/440 |
| 5,563,001 A | * | 10/1996 | Gay ....................... 428/694 R |
| 5,637,402 A | * | 6/1997 | Gay ........................... 428/403 |
| 5,679,402 A | * | 10/1997 | Lee .............................. 427/127 |
| 5,754,936 A | * | 5/1998 | Jansson ........................ 419/10 |
| 5,888,416 A | | 3/1999 | Ikuma et al. |
| 6,136,265 A | * | 10/2000 | Gay ............................. 419/35 |
| 6,244,526 B1 | * | 6/2001 | Schuldt et al. ........... 239/585.1 |
| 6,485,579 B1 | * | 11/2002 | Nillius et al. ............... 148/104 |
| 6,566,990 B1 | * | 5/2003 | Oyama et al. .............. 335/220 |

FOREIGN PATENT DOCUMENTS

| | | |
|---|---|---|
| DE | 39 07 090 | 9/1990 |
| JP | 56-88304 | 7/1981 |
| JP | 2001-155914 | 6/2001 |

* cited by examiner

*Primary Examiner*—Ngoclan T. Mai
(74) *Attorney, Agent, or Firm*—Oblon, Spivak, McClelland, Maier & Neustadt, P.C.

(57) ABSTRACT

A soft magnetic powder material which includes an iron system powdered particle having an insulating coat with high insulation performance, a polyamide system resin, and a thermoplastic resin having a melting point equal to or higher than 200° C.

12 Claims, 7 Drawing Sheets

SOFT MAGNETIC POWDER MATERIAL, SOFT MAGNETIC GREEN COMPACT, AND MANUFACTURING METHOD FOR SOFT MAGNETIC GREEN COMPACT

This application is based on and claims priority under 35 U.S.C. §119 with respect to Japanese Patent Application No. 2001-385039 filed on Dec. 18, 2001, the entire content of which is incorporated herein by reference.

FIELD OF THE INVENTION

The present invention relates to a soft magnetic powder material, a soft magnetic green compact including the soft magnetic powder material, and a manufacturing method for the soft magnetic green compact. More particularly, the present invention pertains to a soft magnetic powder material, soft magnetic green compact including the soft magnetic powder material, and a manufacturing method for the soft magnetic green compact which is used under a high temperature environment.

BACKGROUND OF THE INVENTION

It has been known to apply a soft magnetic powder material which includes a powdered soft magnetic material (i.e., principal ingredient is high purity iron powder) and a powdered resin as a material for constructing a magnetic path forming member such as motor core (e.g., a rotor core and a stator core). By applying the pressure and the heat to the soft magnetic powder material, a soft magnetic green compact is formed. The powdered resin includes a binding function to connect iron system powdered particles and an insulating function for electrically insulating between the iron system powdered particles. By electrically insulating between the iron system powdered particles, an electric characteristic (e.g., resistivity) becomes favorable when an alternating-current magnetic field affects the soft magnetic green compact and the eddy current loss of the soft magnetic green compact can be reduced.

Advantages for forming the soft magnetic powder material with a die are as follows, which includes a high yield which reduces the manufacturing cost; the high flexibility of the soft magnetic green compact compared to a method for accumulating the steel plate, which reduces the size of the soft magnetic green compact and reduces the manufacturing cost; reducing the processes, which reduces the manufacturing cost; and the high recycling efficiency compared to the method or accumulating the steel plates, which contributes to the environmental conservation and to utilize the resources effectively.

Notwithstanding, there are disadvantages for forming the soft magnetic powder material. First, it is difficult to ensure the strength of the soft magnetic green compact formed with the soft magnetic powder material, particularly, under the high temperature condition because the resin is included in the soft magnetic powder material.

Second, because the resin included in the soft magnetic powder material is adhered to a cavity surface of the die when applying the heat, it is necessary to devise to easily remove the soft magnetic green compact made of the soft magnetic powder material from the die.

Third, although the electric characteristic (e.g., resistivity) as the soft magnetic material is improved by the addition of the powdered resin in the soft magnetic powder material, the magnetic characteristic (e.g., the magnetic permeability, saturation flux density) is declined because the resin is deficient in the magnetic permeability. Thus, it is required to strike a balance between the electric characteristic and the magnetic characteristic at high level.

As explained above, because high strength under the high temperature condition is not achieved, the known soft magnetic green compact made of the known soft magnetic powder material has not applied to members such as motor core which requires high strength under the high temperature condition.

The second drawback of forming the soft magnetic green compact made of the soft magnetic powder material may be obviated by lubricating the cavity surface of the die and by mixing the lubricant in the soft magnetic powder material per se. However, in this case, there are the drawbacks that the manufacturing cost is increased, the productivity is reduce, and the strength of the soft magnetic green compact is reduced by adding and applying the lubricant.

A need thus exists for a soft magnetic powder material, soft magnetic green compact including the soft magnetic powder, and a manufacturing method of the soft magnetic green compact which enables to achieve the high strength under the high temperature condition, to be easily ejected from a die, and to strike a balance between the magnetic characteristic and the electric characteristic.

SUMMARY OF THE INVENTION

In light of the foregoing, the present invention provides a soft magnetic powder material which includes an iron system powdered particle having an insulating coat with high insulation performance, a polyamide system resin, and a thermoplastic resin having a melting point equal to or higher than 200° C.

According to another aspect of the present invention, a soft magnetic green compact includes an iron system powdered particle having an insulating coat with high insulation performance, a polyamide system resin, and a thermoplastic resin having a melting point equal to or higher than 200° C., and a soft magnetic powder material including the iron system powdered particle, the polyamide system resin, and thermoplastic resin having the melting point equal to or higher than 200° C. The soft magnetic green compact is formed by pressurizing and heating the soft magnetic powder material.

According to still another aspect of the present invention, a manufacturing method of a soft magnetic green compact includes an iron system powdered particle having an insulating coat with high insulation performance, a polyamide system resin, a thermoplastic resin having a melting point equal to or higher than 200° C., and a soft magnetic powder material including the iron system powdered particle having the insulating coat with high insulation performance, the polyamide system resin, and the thermoplastic resin having a melting point equal to or higher than 200° C. The manufacturing method of the soft magnetic green compact includes a first step for forming a green compact by pressurizing the soft magnetic powder material, and a second step for heating the green compact.

According to further aspect of the present invention, a manufacturing method for a soft magnetic green compact includes a mixing process for forming a soft magnetic powder material including an iron system powdered particle having an insulating coat with high insulation performance, a polyamide system resin, and a thermoplastic resin having a melting point equal to or higher than 200° C., a pressurization process for forming a green compact by applying a pressure to the soft magnetic powder material, and a heating process for heating the green compact. The pressurization process and the heating process are performed in this order.

According to still further aspect of the present invention, a motor includes a case, a shaft rotatably provided on the case, an armature supported by the shaft, a core included in the armature for forming a magnetic path formed with a soft magnetic green compact, and an armature coil included in the armature supported by the core. The soft magnetic green compact includes an iron system powdered particle having an insulating coat with high insulation performance, a polyamide system resin, a thermoplastic resin having a melting point equal to or higher than 200° C., and a soft magnetic powder material including the iron system powdered particle, the polyamide system resin, and thermoplastic resin having a melting point equal to or higher than 200° C. The soft magnetic green compact is formed by pressurizing and heating the soft magnetic powder material.

An electro magnetic actuator includes a case, an operation portion operatively provided on the case, and a core for forming a magnetic path, the core including a soft magnetic green compact. The soft magnetic green compact includes an iron system powdered particle having an insulating coat with high insulation performance, a polyamide system resin, a thermoplastic resin having a melting point equal to or higher than 200° C., and a soft magnetic powder material including the iron system powdered particle, the polyamide system resin, and thermoplastic resin having a melting point equal to or higher than 200° C. The soft magnetic green compact is formed by pressurizing and heating the soft magnetic powder material.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

Figure 1:
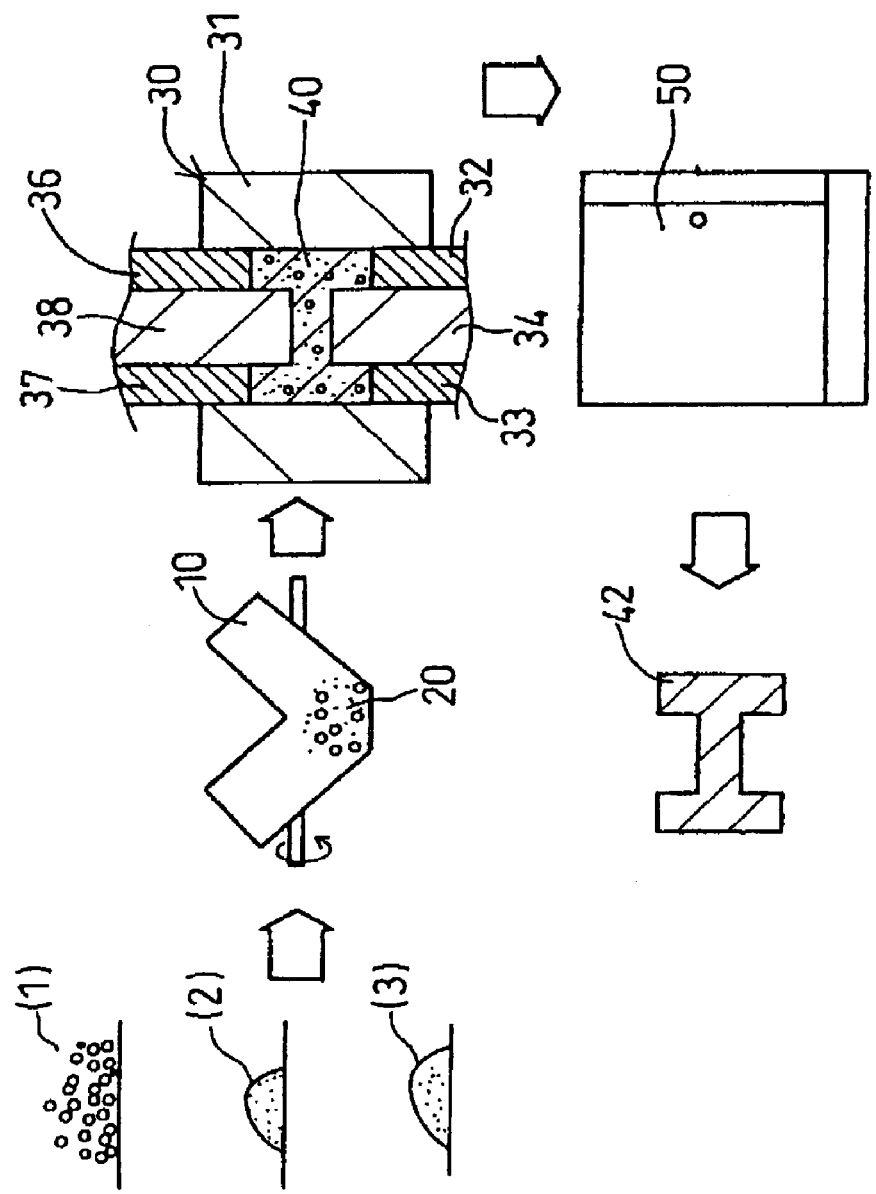
FIG. 1 shows a process view showing a manufacturing process of a soft magnetic powder material and a soft magnetic green compact according to an embodiment of the present invention.

Iron type powdered particles ensure the magnetic characteristic (e.g., magnetic permeability, saturation flux density) of the soft magnetic green compact. It is preferable that the average particle diameter of the iron type powdered particles is as large as possible within the range not to deteriorate the compressive forming performance in order to ensure the magnetic characteristic. The average particle diameter of the iron system powdered particles may be 30–2000 μm or 70–1000 μm or more particularly, 70–500 μm or 100–350 μm may be adopted. The average particle diameter is not limited to the above. In order to ensure the magnetic characteristic, high purity iron is adopted as the iron system powdered particles and it is preferable that the soft magnetic powder material includes 90 wt percent to 95 wt percent of the iron. As the iron system powdered particles, Fe—Si system or Fe—Co system may be adopted. The iron system powdered particle may be configured to be non-spherical which includes irregular concave portion or convex portion. In this case, the irregular concave portion or the convex portion of the iron system powdered particles can hold the resin constituent. The iron system powdered particles may be manufactured according to the following manufacturing method, which includes the water atomizing method or the gas atomizing method, the reduction method (e.g., the gas reduction method), and the mechanical grinding. With the gas atomizing method, the inert gas such as nitrogen and argon gas, and the air can be adopted.

In case the iron system powdered particle which has spherical configuration, polyamide system resin, and the thermoplastic resin having the melting point of equal to or greater than 200° C. (i.e., hereinafter referred as a second thermoplastic resin) are blended, the resin constituent and the iron system powdered particles are separated due to the specific gravity differences to deteriorate the uniformity of the mixture of the iron system powdered particle and the resin constituents because of the large specific gravity differences between the resin and the iron system powdered particles. On the other hand, by employing the iron system powdered particle which has a configuration having the irregular concave portion or the convex portion, the resin powder can be held by the iron system powdered particle when mixing the polyamide system resin, the second thermoplastic resin, and the iron system powdered particle. Thus, the separation of the resin constituents and the iron system powdered particle due to the gravity difference when forming the mixed powder of the iron system powdered particle, the polyamide system resin, and the second thermoplastic resin can be restrained. Thus, it is advantageous to ensure the uniform dispersibility of the mixed powder. Accordingly, it is preferable that the average particle diameter of the iron system powdered particle is determined to be greater than the average particle diameter of the polyamide system resin and the average particle diameter of the second thermoplastic resin.

An insulating coat having high electric insulation is formed on the surface of the iron system powdered particles. The insulating coat increases the resistivity of the soft magnetic powder material, reduces the eddy current loop generated to the soft magnetic green compact deriving from the alternating-current magnetic field when the alternating-current magnetic field affects the soft magnetic green compact, and reduces the eddy current loss. Thus, it is preferable that the insulating coat includes the high electric insulation. It is preferable that equal to or greater than one-half the surface of the iron system powdered particle, more particularly, two-third of the surface of the iron system powdered particle is covered with the insulating coat. It is preferable that almost entire surface of the iron system powdered particle is covered with the insulating coat.

The insulating coat includes the phosphoric acid system coat formed by the phosphoric acid conversion treatment. A known phosphoric acid system coat is adopted as the phosphoric system coat and the phosphoric acid system insulating coat may include the phosphoric constituent, the boric acid constituent, and the magnesia constituent. In this case, the phosphoric acid insulating coat can be formed on the surface of the iron system powdered particle in a first step for contacting the surface of the iron system powdered particle and the phosphoric acid system treatment fluid including the phosphoric acid, the boric acid, and the magnesia. Further, the phosphoric acid iron system insulating coat, the zinc phosphate system insulating coat, and the phosphoric acid manganese system insulating coat may be adopted. Although the thickness of the insulating coat is selected, the thickness of the insulating coat including 5–500 nm, 5–100 nm, 5–500 nm can be adopted considering to ensure the magnetic permeability. The thickness of the insulating coat is not limited to the foregoing range. When the thickness of the insulating coat is too thin, although the magnetic characteristic such as the magnetic permeability is improved, the resistivity is decreased, which is apt to increase the eddy current loss of the soft magnetic green compact. On the other hand, when the insulating coat is too thick, although the eddy current loss is restrained due to the insurance of the resistivity, the magnetic characteristic of the magnetic permeability is declined. The thickness of the insulating coat is determined for balancing the foregoing matter.

The polyamide system resin (i.e., PA system resin) includes an amide group in the molecular structure, corresponds to the thermoplastic resin which has relatively low melting point, and has high lubricating property. The polyamide system resin includes PA6, PA66, PA11, PA12, PA46, and copolymer including at least two of them. Generally, the polyamide system resin having the melting point of 100–200° C. or 130–180° C. may be adopted.

The second thermoplastic resin includes a thermoplastic resin having the melting point of equal to or greater than 250° C., a thermoplastic resin having the melting point of equal to or greater than 260° C., and a thermoplastic resin having the melting point of equal to or greater than 270° C. The melting point of the second thermoplastic resin is determine to be greater than the melting point of the polyamide system resin. Polyphenlyene sulfide system resin (hereinafter refereed as PPS) may be adopted as the second thermoplastic resin. Polyphenlyene sulfide is the thermoplastic material having high melting point and high crystalline with high heat resistance. The PPS includes favorable heat resistance and the electric insulation under the high temperature condition. The PPS may be straight chain type or bridging type.

In order to ensure the joint strength of the iron system powdered particles, generally, it is more preferable to directly joint each insulating coat of the iron system powdered particle compared to intervening the resin constituent. However, in this case, because the resin constituent is not included, removability is not sufficient (i.e., it is difficult to remove the green compact from the die) and the green compact may be damaged when ejected from the die and the productivity may be declined. On the other hand, when the melting point of the second thermoplastic resin is higher than the melting point of the polyamide system resin, because the second thermoplastic resin is unlikely melted compared to the polyamide system resin, the second thermoplastic resin functions to block the excessive liquidity of the polyamide system resin at the border with the iron system powdered particles under the heated condition or under the operation. Thus, with this construction, the polyamide system resin does not excessively liquidated at the border with the iron system powdered particles and restrain that the polyamide system resin excessively covers the insulating coat of the iron system powdered particle.

It is preferable that the polyamide system resin and the second thermoplastic resin of the soft magnetic powdered material are in powdered form. In case the average particle diameter of the powdered resin of the polyamide system resin and the second thermoplastic resin is too large, it is difficult to ensure the strength under the high temperature and is difficult to strike a balance between the high magnetic characteristic (e.g., magnetic permeability, saturation flux density) and the electric characteristic (e.g., resistivity). It is preferable that the particle diameter of the polyamide system resin and the second thermoplastic resin is smaller than the particle diameter of the iron system powdered particle. The size of the polyamide system resin and the second thermoplastic resin is preferably determined to be equal to or smaller than 200 μm, more preferably, determined to be equal to or smaller than 100 μm, further preferably, determined to be equal to or smaller than 50 μm, and may be determined equal to or smaller than 10 μm. Particularly, greater than 80 wt percent of the polyamide system resin and the second thermoplastic resin respectively include the average particle diameter size which is determined to be equal to or smaller than 200 μm, more preferably, determined to be equal to or smaller than 100 μm, and further preferably, determined to be equal to or smaller than 50 μm. When the average particle diameter of the polyamide system resin is determined to be D1 and the average particle diameter of the second thermoplastic resin is determined to be D2, D1 may be determined to be equal to D2, D1 may be determined to be nearly equal to D2, D1 may be determined to be less than D2, and D1 may be determined to be greater than D2 In this case, the average particle diameter of the iron system powdered particles is determined to be greater than the average particle diameter of the powdered resin.

When the total resin amount in the soft magnetic powder material is increased, the ratio of the iron system powdered particle is relatively reduced, the magnetic characteristic (i.e., magnetic permeability, saturation flux density) is declined, and the strength under the high temperature is declined. When the total resin amount in the soft magnetic power material is decreased, the magnetic characteristic is increased because the ratio of the iron system powdered particle is increased. However, because the relative amount of the polyamide system resin is decreased, the binding function for adhering between the iron system powdered particles is declined and the lubrication performance relative to the die is declined. In light of the foregoing, when the soft magnetic powder material is determined to be 100 percent, it is preferable to determine the total resin amount of the polyamide system resin and the second thermoplastic resin to be equal to or less than 3 wt percent, more preferably to be equal to or less than 1 wt percent, further preferably to be equal to or less than 0.8 wt percent or 0.7 wt percent. For example, the total resin amount is determined to be 0.1–3.0 wt percent, 0.1–2.0 wt percent, or 0.1–1.0 wt percent. Notwithstanding, the total resin amount in the soft magnetic powder material is not limited to the foregoing ratio.

When the total of the polyamide system resin and the second thermoplastic resin is determined to be 100 percent, the ratio of the polyamide system resin in the total resin amount is determined to be 1–99 wt percent, more particularly, to be 20–80 wt percent. In this case, the ratio of the second thermoplastic resin in the total resin amount is determined to be 1–99 wt percent, more particularly, to be 20–80 wt percent. Although the second thermoplastic resin is advantageous to ensuring the strength of the soft magnetic green compact under the high temperature, because the ratio of the polyamide system resin is relatively decreased by increasing the ratio of the second thermoplastic resin, the lubrication capability is deficit and there may be the drawback that the pressure when ejecting the green compact from the forming cavity of the die is increased. Although the lubrication performance is improved and the ejection force when removing the green compact from the forming cavity of the die is reduced because the relative amount of the polyamide system resin is increased when less amount of the second thermoplastic resin is added, there may be drawback that the strength of the soft magnetic green compact under high temperature is declined. Thus, it is preferable to include the foregoing ratio of the polyamide system resin and the second thermoplastic resin.

The foregoing soft magnetic green compact is formed by pressurizing and heating the foregoing soft magnetic powder material. The pressurization and the heating can be performed either separately or simultaneously. In this case, the manufacturing method for the soft magnetic green compact may include a first step for forming a green compact by compression forming the soft magnetic powder material by the die such as a die and a second step for heating the green compact and curing the green compact. It is preferable to perform the first step using the die under a normal temperature region. By pressurizing the soft magnetic powder material under the normal temperature region, the adhesion of the resin constituent to the cavity surface of the die can be restrained and the green compact can be favorably removed from the cavity surface of the die. Although the applied pressure under the first step can be selected in accordance with the variation of the iron system powdered particle and the configuration of the soft magnetic green compact, 50 MPa–1000 Mpa (i.e., approximately 500 kgf/cm$^2$14 10000 kgf/cm$^2$ when 1 kgf/cm$^2$ is determined nearly equal to 0.1 Mpa), more particularly, 100 Mpa–800 Mpa (i.e., approximately 1000 kgf/cm$^2$–8000 kgf/cm$^2$) may be adopted for the applied pressure at the first step. Provided that the soft magnetic powder material is pressurized and heated simultaneously in the first step, it may be difficult to remove the green compact from the die because the resin included in the soft magnetic powder material may be adhered to the cavity surface of the die such as the metal die, which, thus reduced the productivity.

It is preferable that the pressurized time under the first step is determined to be 0.1–20 seconds, 0.5–10 seconds, or 0.5–5 seconds. Shorter pressurized time is preferable in order to improve the productivity. The applied pressure and the pressurized time is not limited to the foregoing examples. Although the atmosphere ambient may be adopted as the ambient, the inactive gas may be applied as the ambient. In the second step, it is preferable to melt the both polyamide system resin and the second thermoplastic resin for increasing the adhesion performance relative to the iron system powdered particle s. Thus, the second step can be preformed under the condition that the green compact is heated. Because the melting point of the polyamide system resin is relatively low, the polyamide system resin is likely moved among grain boundary of the iron system powdered particles under the heated condition. Thus, by providing the moved polyamide system resin to the surface of the iron system powdered particles in the form of the flake shape or membrane shape, the polyamide system resin is likely to effectively function as the insulating coat such as the phosphoric acid coat compared to the case that the polyamide system resin is formed in the particle form. Accordingly, the foregoing construction is advantageous to restraining the eddy current loss by increasing the resistivity of the soft magnetic green compact and the soft magnetic powdered material. However, when the polyamide system resin is excessively liquidated at the grain boundary among the iron system powdered particles, the magnetic characteristic of the soft magnetic green compact may be likely declined and further, the adhesion strength between the iron system powdered particle s may be declined. Thus, in order to ensure the magnetic characteristic of the soft magnetic green compact and in order to ensure the strength of the soft magnetic green compact, the excessive liquidity of the polyamide system resin has to be restrained.

When the heating temperature is too high, the resin included in the soft magnetic powder material may be deteriorated and the insulating coat may be deteriorated. When the heating temperature is too low, the adhesion force by the resin included in the soft magnetic powder material is not improved. In light of the foregoing, the heating temperature may be determined to be equal to or less than 450° C., more preferably, determined to be equal to or less than 350° C. Thus, in the second step, the temperature may be determined to be equal to or less than 450° C., more preferably, determined to be equal to or less than 350° C. It is preferable that the lower limit temperature in the second step exceeds the melting point of the second thermoplastic resin. Thus, the lower limit temperature in the second step may be determined equal to or higher than 250° C., equal to or higher than 270° C., equal to or higher than 280° C., or equal to or higher than 290° C. in accordance with the variations of the second thermoplastic resin. Accordingly, the heating temperature when heating the soft magnetic powdered material may be determined to be 250–450° C., more particularly, to be 270–350° C. Although the atmosphere ambient can be adopted as the ambient for the second step, the inactive gas may be applied as the ambient for the second step. Generally, because the second step is performed not in the die such as the metal die, but is performed under the unbound state, it is not necessary to consider the removing performance when ejected from the die such as the metal die. The curing may be performed by heating the pressurized powder simultaneous with forming the green compact from the soft magnetic powder material in the die such as the metal die whose temperature is adjusted.

The soft magnetic green compact can be applied to a magnetic path forming member applied to the electro magnetic actuators represented as motors and electromagnetic valves. The magnetic path forming member applied to the motor includes a rotor core and a stator core. The motor applied with the magnetic path forming member includes a motor for anti-lock brake system, a motor for a power steering, a motor for a wiper, a motor for a wind regulator, a motor for sunroof, etc. The soft magnetic green compact can be applied to the magnetic path forming member used for various sensors such as a displacement sensor and torque sensor. Although the soft magnetic green compact made from the soft magnetic powder material of the embodiment of the present invention is appropriate for the soft magnetic green compact used under the high temperature condition such as the engine room, the soft magnetic green compact of the embodiment of the present invention is not limited to the soft magnetic green compact used under the high temperature environment because the removing performance from the forming cavity of the die is preferable.

FIG. 1 shows a manufacturing process of soft magnetic powder material and soft magnetic green compact. The following materials (1), (2), (3) are used.

(1) Somaloy 550 of Hoganas is applied as the metal powder. The metal powder includes high purity iron system powdered particle s (i.e., iron powder; Fe including less than 0.01 wt percent of C; $H_2$ loss 0.08 wt percent, particle diameter approximately 20–200 μm) whose surface is coated with the phosphoric coat by the phosphoric conversion coat treatment. The phosphoric system coat functions as the insulating coat which has high electric insulation and the phosphoric system coat is formed on the almost entire surface of the iron system powdered particle. The iron system powdered particle ensures the soft magnetic characteristic. Because the phosphoric coat includes the high electric insulating resistance, it is advantageous to reducing the eddy current loss of the soft magnetic green compact when the alternating-current magnetic field is affected.

(2) Polyamide system resin (i.e., average particle diameter corresponds to approximately 10 μm) is applied. The average particle diameter corresponds to the most frequent value of the granulometry. The polyamide system resin corresponds to the thermoplastic resin which has a good lubrication and functions as the powder lubricant. The polyamide system resin also contributes to ensure the adhesion strength between the polyamide system resin and the iron system powdered particle s under the normal temperature region. The melting point of the polyamide system resin used in this embodiment of the present invention is approximately 140° C.

(3) PPS resin (i.e., average particle diameter corresponds to approximately 18 μm). The average particle diameter corresponds to the most frequent value of the granulometry. The PPS resin functions as the second thermoplastic resin for contributing to increase the adhesion strength between the iron system powdered particle s particularly under the high temperature condition. The melting point of the PPS resin corresponds to approximately 280° C.

As shown in FIG. 1, the iron system powder of (1) and the resin powder (2), (3) are measured by a predetermined amount to be mixed for sixty minutes by rotating a mixer 10 thus to form a mixed powder 20. Using the soft magnetic powder material of the mixed powder 20 in which the iron system power particle, the polyamide system resin, and the PPS resin are mixed, the first step is performed. That is, the soft magnetic powder material is supplied to a cavity of a metal die 30, the soft magnetic powder material is pressurized to be formed in the metal die 30 under the room temperature, and a green compact 40 which is the pressurized powder body is obtained. The metal die 30 includes a cylindrical die 31, a bottom die fitted to the die 31, and a top die 36 fitted to the die 31. The bottom die includes a cylindrical outer bottom die and an inner bottom die. The top die includes a cylindrical outer top die 37 and an inner top die 38.

With the manner of this embodiment of the present invention, because the mixed powder. 20 which is the soft magnetic powder material in the cavity of the metal die 30 is pressurized under the room temperature, the resin constituent of the mixed powder 20 is not melted and this is advantageous to obviating the drawback that the resin constituent is adhered to the cavity die surface of the metal die 30. The condition for pressurizing the mixed powder 20 of the soft magnetic powder material is determined to apply the pressure force of 600 Mpa (i.e., approximately 6000 kgf/$cm^2$) for approximately one second.

Then, the curing is performed relative to the green compact 40 by heating the green compact 40 which is the pressurized powder body removed from the cavity of the metal die 30 in a heat-treating furnace 50 under the atmosphere, the second step to obtain a soft magnetic green compact 42 (i.e., second step). In the second step, the polyamide system resin and the PPS resin are melted by the heat and increase the function for binding the iron system powdered particles. The heating condition of the second step is determined to apply the heating temperature of 300° C. for sixty minutes. The pressurization is not performed in the second step and the green compact 40 is under unbound state. Thus, the adhesion of the green compact 40 and the soft magnetic green compact 42 to the die can be avoided in the second step.

Figure 2:
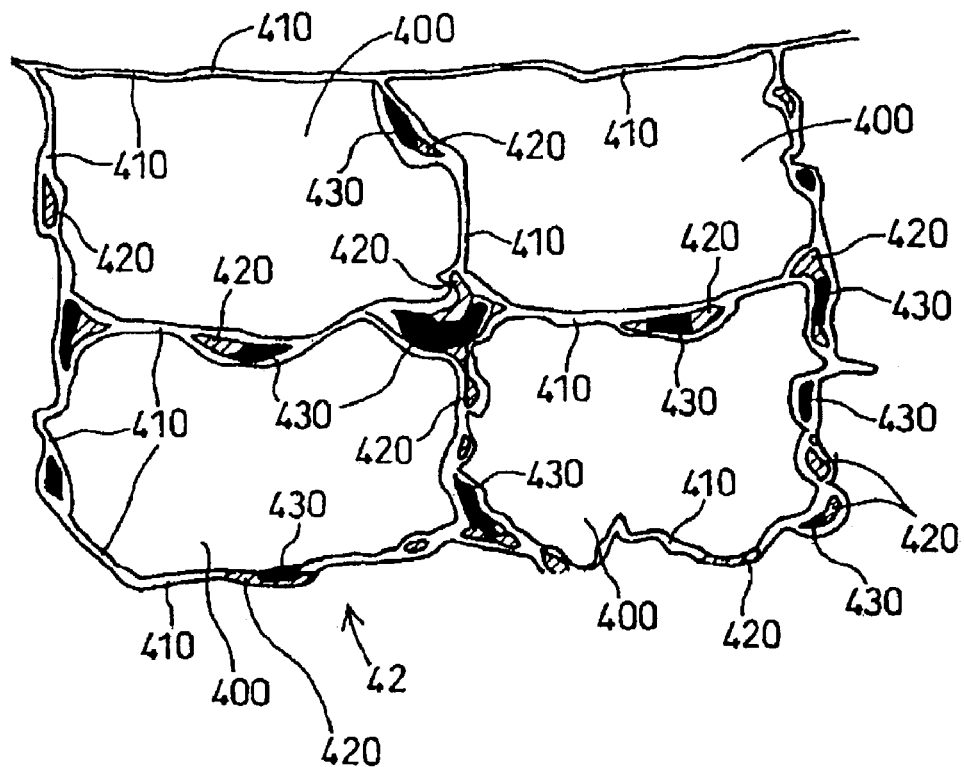
FIG. 2 shows an internal construction of the soft magnetic green compact observed by EPMA according to the embodiment of the present invention.

FIG. 2 shows an internal construction of the soft magnetic green compact 42 after performing the curing which is observed with EPMA. With the observed soft magnetic green compact 42, 100 percent of the soft magnetic powder material 1 includes 0.3 percent of the polyamide system resin and 0.3 percent of the PPS resin according to weight ratio. As shown in FIG. 2, a phosphoric acid system coat 410 of thin membrane is formed on the entire surface of iron system powdered particle s 400. The iron system powdered particles 400 coated with the phosphoric acid coat 410 are connected one another. In this case, the phosphoric system coats 410 are directly connected in most portions for connecting the iron system powdered particles 400. Flake phases 420 (shown with hatched line) of the polyamide system resin and flake phases 430 (i.e., backed out region) of the PPS resin are provided on the border region of the iron system powdered particle s 400 which is coated with the phosphoric system coat 410. According to FIG. 2, the flake phases 420 of the polyamide system resin and the flake phases 430 of the PPS resin are unlikely melted into one another, and rather positioned independently. According to FIG. 2, the flake phases 420 of the polyamide system resin and the flake phases 430 of the PPS resin are located at recess portions of the iron system powdered particle s 400. Further, according to FIG. 2, it is observed that the excessive liquidity of the phase 420 of the polyamide system resin is blocked by the phase 430 of the PPS resin. Thus, it is effective that the particle diameter of the PPS resin is greater than the particle diameter of the polyamide system resin in order to block the excessive liquidity of the phase 420 of the polyamide system resin.

According to the experiments performed by the applicants, the adhesion strength between the phosphoric system coats is high because the strength of the green compact after the curing is high although the removing performance of the green compact from the metal die 30 is not favorable with the test piece which is manufactured under the same condition but is not added with the resin. As foregoing, by blocking the excessive liquidity of the phase 420 of the polyamide system resin with the phase 430 of the PPS resin, the adhesive performance between the phosphoric acid system coats which have high adhesion strength for coating the iron system powdered particles 400 can be ensured and contributes to ensure the strength of the soft magnetic green compact 42.

The removability (i.e., degree of the ejection force applied when removing the green compact 40) of the green compact 40 from the cavity of the metal die 30 is significant in the embodiment. In this case, it is required to reduce the ejection force when removing the green compact 40 from the cavity of the metal die 30. Generally, the ejection force is reduced by applying the lubricant to the cavity die surface of the metal die 30 and by mixing the soft magnetic powder material and the lubricant. Notwithstanding, this method includes drawbacks regarding the manufacturing cost and the productivity. In addition, with the foregoing means, the performance and the strength of the soft magnetic green compact 42 after being performed with the curing may be declined. On the other hand, by adding predetermined ratio of the polyamide system resin having the lubrication function other than the binding function in the soft magnetic powder material, the binding function is increased and the ejection force applied when removing the green compact 40 from the cavity of the metal die 30 can be effectively reduced.

Notwithstanding, in case adding only the polyamide system resin out of the resin in the soft magnetic powder material, the strength of the soft magnetic green compact 42 may be significantly declined when used under the high temperature environment (e.g., 180–260° C.) such as the motor used in the engine room. This is because the environmental temperature exceeds the melting point of the polyamide system resin. The adhesion strength by the polyamide system resin cannot be ensured under the high temperature condition. In order to obviate the foregoing drawback, the PPS resin is applied. The melting point of the PPS resin corresponds to 270–290° C., which is higher than the foregoing high temperature environment. Thus, because the PPS resin does not melt under the foregoing high temperature condition, the adhesion force of the PPS resin is performed as the adhesion strength when the soft magnetic green compact 42 is used under the high temperature condition. In addition, because the PPS resin includes a function for blocking the liquidity for preventing the excessive move of the melted polyamide system resin liquidated to the surface of the iron system powdered particle s under the high temperature condition, the PPS resin contributes to improve the strength of the green compact thus the product made from the green compact under the high temperature environment.

A test piece corresponding to the soft magnetic green compact 42 is made from the soft magnetic powder material to perform experiments to be evaluated. The test piece is basically made in the foregoing manner. The relationship between the amounts of the resin including the polyamide system resin and the PPS resin included in the soft magnetic powder material and each characteristic value is shown according to the experiments. The polyamide system resin is referred as PA and the PPS resin is referred as PS in the drawing figures.

Figure 3:
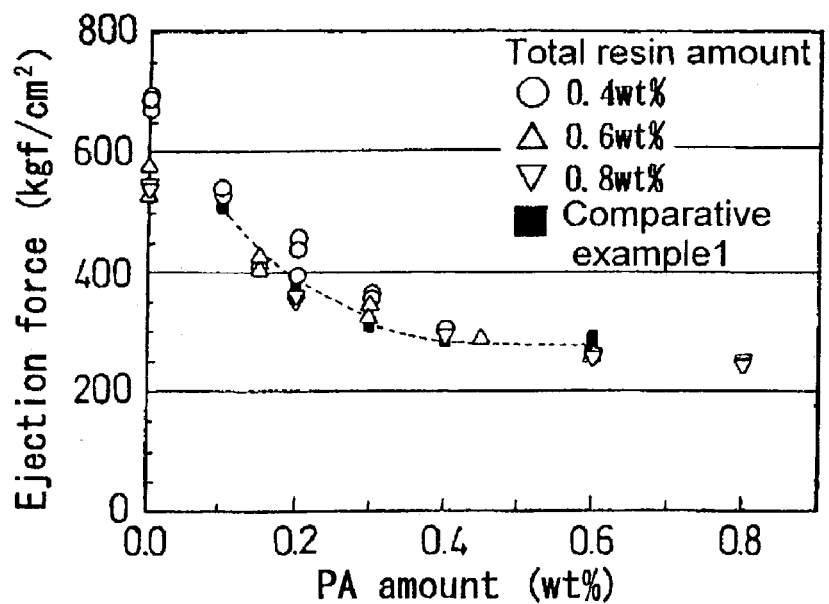
FIG. 3 is a graph showing a relationship between an amount of a polyamide system resin and an ejection pressure.
Figure 4:
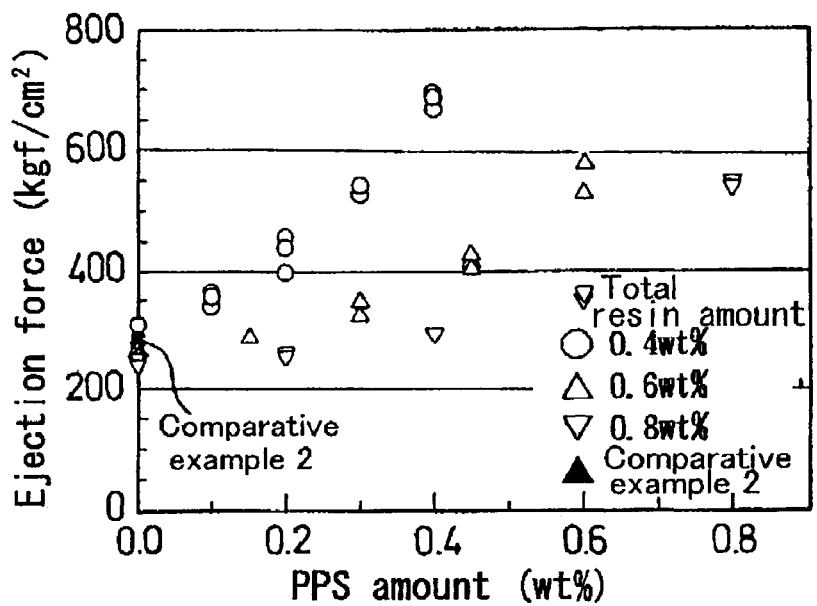
FIG. 4 is a graph showing a relationship between an amount of PPS resin and the ejection pressure.

The removability of the green compact 40 which is the pressurized powder body from the metal die 30 after performing the first step is explained referring to FIGS. 3–4 of the present invention. The horizontal axis of FIG. 3 shows the amount of the polyamide system resin added. The vertical axis of FIG. 3 shows an ejection force applied when the test piece formed as the green compact corresponding to the pressurized powder body is removed from the metal die 30. As shown in FIG. 3, a circle shows the case that the total mount of resin is 0.4 wt percent, a triangle shows the case that the total resin amount corresponds to 0.6 wt percent, and an inverted triangle shows the case that the total resin amount corresponds to 0.8 wt percent. That the total resin amount is 0.4 wt percent means that when the mixed powder as a whole is determined to be 100 percent, the total resin amount occupied 0.4 wt percent and the iron system powdered particles coated with the phosphoric acid coat occupies 99.6 wt percent. When the total resin amount is 0.4 wt percent and the amount of the polyamide system resin amount is 0.1 wt percent, it shows that 0.1 wt percent of the polyamide system resin and 0.3 wt percent of the PPS resin is included. When the total resin mount is 0.6 wt percent and the amount of the polyamide system resin is 0.3 wt percent, it is shown that 0.3 wt percent of the polyamide system resin and 0.3 wt percent of the PPS resin are included. A blacked out rectangular shows a first comparative example 1. The first comparative example 1 includes the iron system powdered particles coated with the phosphoric acid coat which is added with the polyamide system resin but not added with the PPS resin and in which the amount of the polyamide system resin is varied. As shown in FIG. 3, when the amount of the polyamide system resin is increased, the ejection force applied when removing the test piece is reduced, which shows that the polyamide system resin largely contributes to the reduction of the ejection force applied when removing the green compact from the die.

The horizontal axis of FIG. 4 shows the amount of the PPS resin. The vertical axis of FIG. 4 shows the ejection force applied when removing the test piece formed as the green compact corresponding to the pressurized powder body from the metal die 30. According to the experiment shown in FIG. 4, a second comparative example 2 includes the iron system powdered particle coated with the phosphoric acid coat which is added with 0.6 wt percent of polyamide system resin but the PPS resin is not included. A shown in FIG. 4, the amount of the PPS resin does not influence on the ejection force applied when removing the test piece which is the green compact from the metal die 30. Thus, considering only about the ejection force applied when removing the green compact, it is preferable to add more polyamide system resin.

Figure 5:
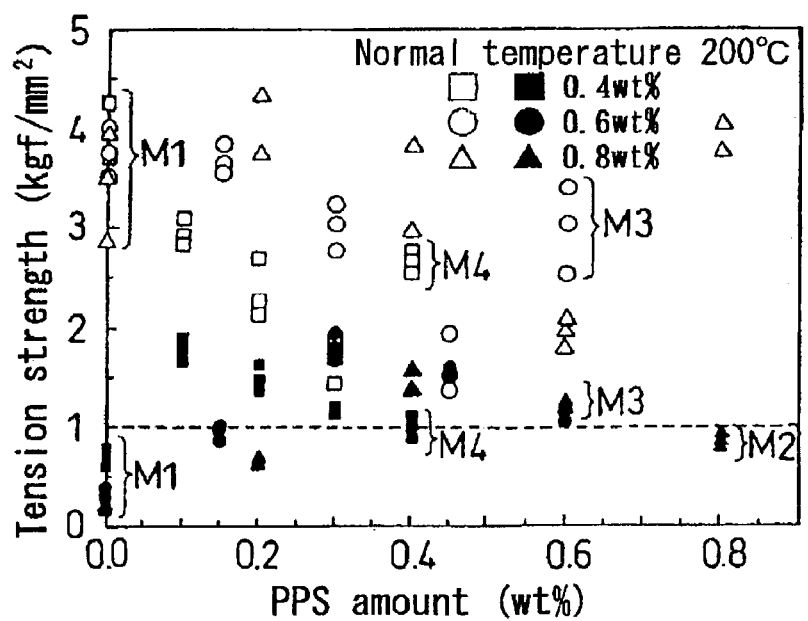
FIG. 5 is a graph showing a relationship between the amount of the PPS resin and a tension strength of the soft magnetic green compact under a normal temperature and under 200° C.

The tension strength of the test piece corresponding to the soft magnetic green compact after being performed with the curing will be explained referring to FIGS. 5–6. The horizontal axis of FIG. 5 shows the amount of the PPS resin when the soft magnetic powder material is determined to be 100 percent. The vertical axis of FIG. 5 shows the tension strength under the normal temperature and the tension strength under the temperature of 200° C. The tension strength shows the tension strength of the test piece formed with the soft magnetic green compact performed with the curing (i.e., 300° C. for one hour) by heating green compact formed by pressurizing the soft magnetic powder material under the foregoing pressurization condition and the foregoing heating condition. The tension strength experiment is performed based on "metal material tension experiment method" of JIS Standard Z-2241. As comprehended from FIG. 5, although the test pieces M1 in which only the polyamide system resin is added, that is, with the test pieces M1 which is not added with the PPS resin show the high value of the tension strength under the room temperature, the strength under the high temperature environment (i.e., 200° C.) is low which cannot exceeds 1 kgf/mm$^2$ (i.e., nearly equal to 9.8 Mpa). With the test pieces M2, M3, and M4 in which only the PPS resin is added, the strength under the high temperature environment is not sufficient.

Notwithstanding, as comprehended from FIG. 5, by applying the soft magnetic powder material added with both the polyamide system resin and the PPS resin, the strength under the high temperature environment is improved. According to the experimental result, in order to ensure the strength under high temperature environment, it is crucial to add both the polyamide system resin and the PPS resin.

With the soft magnetic green compact including the soft magnetic powder material including the iron system powdered particle coated with the phosphoric acid coat (i.e., which does not include neither polyamide system resin nor the PPS resin) includes the tension strength of approximately 2.6 kgf/mm$^2$ under the normal temperature and the tension strength of approximately 2.6 kgf/mm$^2$ under the temperature of 200°C.

Figure 6:
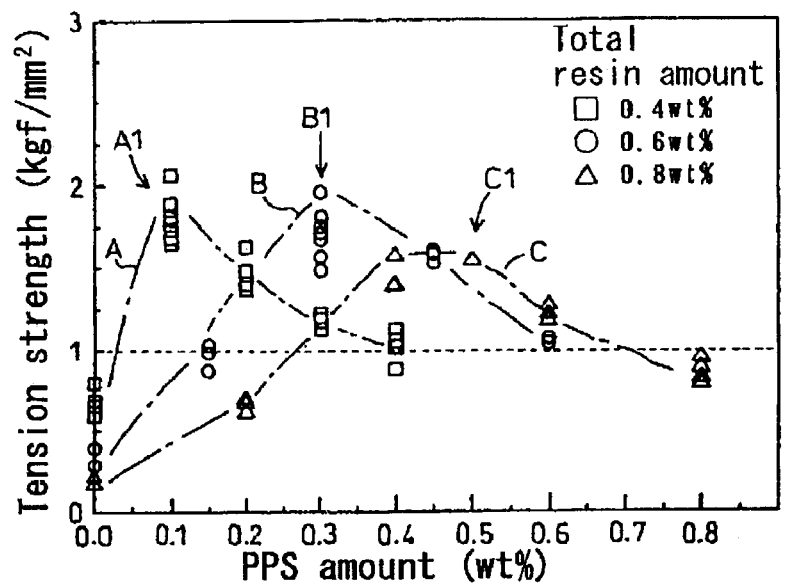
FIG. 6 is a graph showing a relationship between the amount of the PPS resin and the tension strength of the soft magnetic green compact under 200° C.

The horizontal axis of FIG. 6 shows the amount of the PPS resin added. The vertical axis of FIG. 6 shows the tension strength of the test piece corresponding to the soft magnetic green compact under the temperature of 200° C. As shown with a peak region A1 of a characteristic line A, the tension strength under the high temperature is high when the total resin amount is 0.4 wt percent and the ratio of the PPS resin is 0.1 wt percent (i.e., the ratio of i the polyamide system resin is 0.3 wt percent). As shown with a peak region B1 of a characteristic line B, the tension strength under the high temperature becomes high when the total resin amount is 0.6 wt percent and the ratio of the PPS resin is 0.3 wt percent (i.e., the ratio of the polyamide system resin is 0.3 wt percent). As shown with a peak region C1 of a characteristic line C of FIG. 6, the tension strength is high when the total resin amount is 0.8 wt percent and the ratio of the PPS resin is approximately 0.5 wt percent (i.e., the ratio of the polyamide system resin is 0.3 wt percent). In light of the foregoing, it is determined that the high tension strength can be achieved under the high temperature when the ratio of the polyamide system resin is approximately 0.3 wt percent and the preferable mixture ratio is determined when determining the mixed powder of the soft magnetic powder material as 100 percent.

Figure 7:
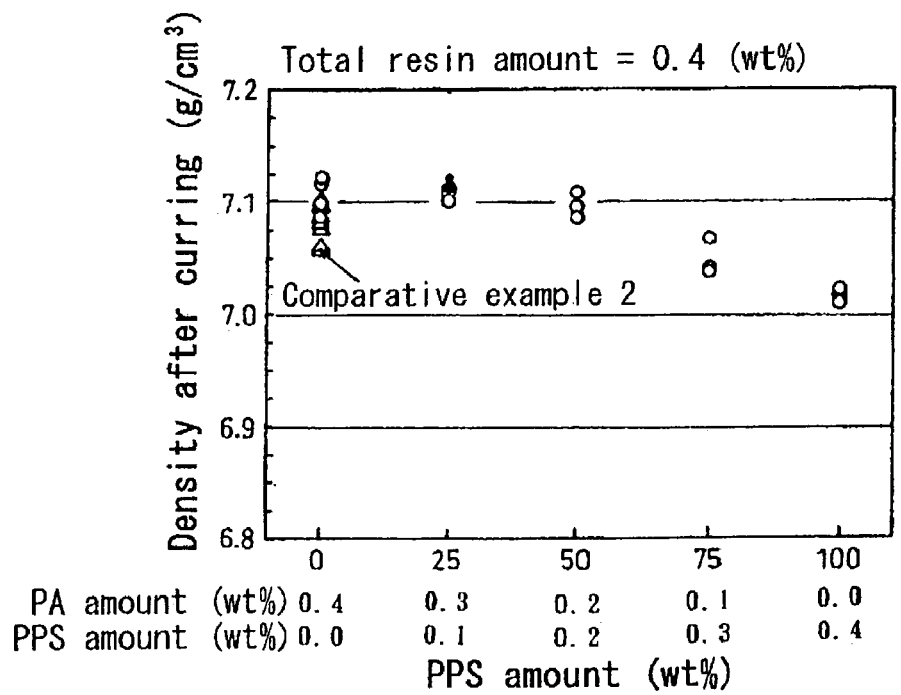
FIG. 7 is a graph showing a relationship between the amount of the polyamide system resin and the PPS resin in the soft magnetic powder material and a density of a test piece and showing a relationship between a ratio of the PPS resin in a total resin amount and the density of the test piece.

The density of the test piece after being performed with the curing of the test piece corresponding to the green compact will be explained referring to FIG. 7. The horizontal axis of FIG. 7 shows the ratio of the PPS resin in the total resin amount when the total resin amount is determined to be 100 percent. The horizontal axis of FIG. 7 also shows the amount of the polyamide system resin and the PPS resin in the soft magnetic powder material when the amount of the soft magnetic powder material is determined to be 100 percent. The vertical axis of FIG. 7 shows the density of the test after being performed with the curing. In this case, the total resin amount is determined to be 0.4 wt percent and the applied pressure in the first step is determined to be 6000 kgf/cm$^2$ (i.e., 600 Mpa). As shown in FIG. 7, when the total resin amounts are identical, the density of the test piece corresponding to the soft magnetic green compact is favorable even under the condition that the ratio of the PPS resin in the total resin amount is increased. Particularly, the density of the test piece is favorable when the PPS resin corresponds to 0.1 wt percent, 0.2 wt percent or 0.3 wt percent. The second comparative example 2 is formed by pressurizing and heating the iron system powdered particle which is coated with the phosphoric acid coat includes 0.6 wt percent of polyamide system resin and does not include PPS resin.

Figure 8:
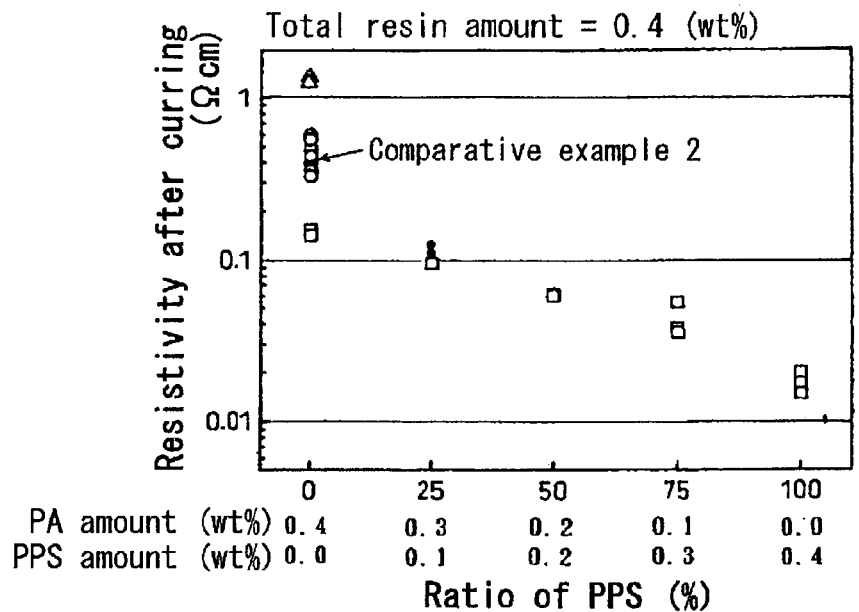
FIG. 8 is a graph showing a ratio of the polyamide system resin and the PPS resin in the soft magnetic powder material and a resistivity of the test piece after curing.

The resistivity after curing of the test piece corresponding to the green compact is explained with reference to FIG. 8. The horizontal axis of FIG. 8 shows the ratio of the PPS resin in the total resin amount (i.e., shown with the axis having the value of 0 percent, 25 percent, 50 percent, 75 percent, and 100 percent) when the total resin amount is determined to be 100 percent. The horizontal axis of FIG. 8 also shows the amount of the PS resin and the polyamide system resin (i.e., shown with the axis having 0.4 percent. 0.3 percent, 0.2 percent, and 0.1 percent) in the soft magnetic powder material when the total amount of the soft magnetic powder material is determined to be 100 percent. The vertical axis of FIG. 8 shows the resistivity of the test piece corresponding to the green compact after being performed with the curing. In this experiment, the applied pressure in the first step is determined to be 6000 kgf/cm$^2$ (i.e., 600 Mpa). As shown in FIG. 8, when the total resin amounts are identical, the resistivity is increased as the amount of the polyamide system resin is increased. That is, the resistivity is declined as the amount of the PPS resin is increased. As shown in FIG. 8, the resistivity is considerably declined when the polyamide system resin corresponds to 0 percent. Thus, in order to restrain the eddy current loss by increasing the resistivity of the test piece, it is preferable to have more amount of the polyamide system resin.

The reason that the resistivity is increased as the amount of the polyamide system resin is increased as shown in the experiment shown in FIG. 8 is considered that because the melting point of the polyamide system resin is lower than the PPS resin, the polyamide system resin is likely to be liquidated between the iron system powdered particles coated with the phosphoric acid coat when heated and is likely to be provided in the form of the flake or the membrane compared to the PPS resin. Because the polyamide system resin includes high electric insulation, it is advantageous to restrict the electric passage when the polyamide system resin is provided to coat the iron system powdered particles in the form of the flake or the membrane and to increase the resistivity of the test piece corresponding to the soft magnetic green compact.

Figure 9:
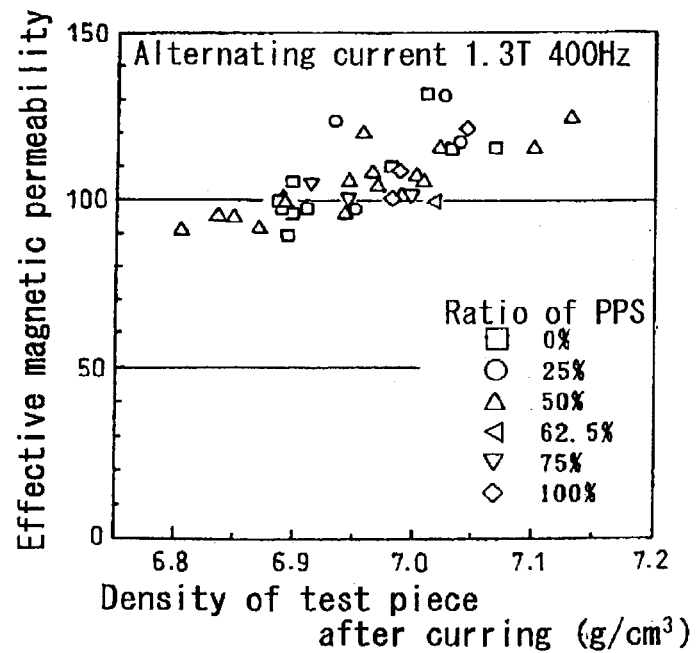
FIG. 9 is a graph showing a relationship between the density of the test piece after the curing and an effective magnetic permeability.

The effective magnetic permeability will be explained with reference to FIGS. 9–10. The horizontal axis of FIG. 9 shows the density of the test piece corresponding to the soft magnetic green compact after being performed with the curing. The vertical axis of FIG. 9 shows the effective permeability of the test piece corresponding to the soft magnetic green compact after being performed with the curing. The total resin amount is determined within 0.4–0.8 wt percent. In this case, when the total amount of the polyamide system resin and the PPS resin is determined to be 100 percent, the ratio of the PPS resin is varied as 0 percent, 25 percent, 50 percent, 62.5 percent, 75 percent, and 100 percent. The effective permeability is measured under the condition that the alternating current of 400 Hz is energized to the toroidal coil and the alternating-current magnetic field (i.e., 1.3 T) is generated. As shown in FIG. 9, although the density of the test piece corresponding to the soft magnetic green compact after being performed with the curing influences the effective permeability, the favorable effective permeability can be obtained even when the density of the test piece is varied by the variation of the added ratio of the polyamide system resin and the PPS resin or by the variation of the total resin amount.

Figure 10:
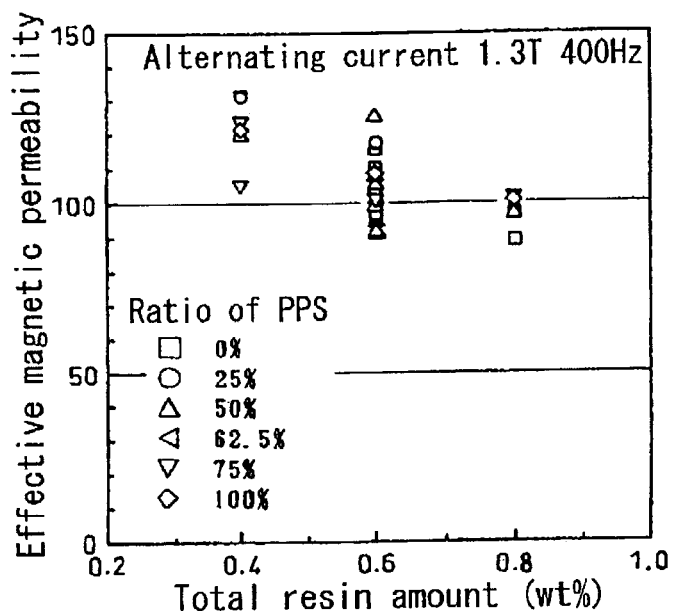
FIG. 10 is a graph showing a relationship between a total resin amount in the soft magnetic powder material and the effective magnetic permeability of the test piece after the curing.

The horizontal axis of FIG. 10 shows the total resin amount in the soft magnetic powder material. The vertical axis of FIG. 10 shows the effective permeability of the test piece corresponding to the soft magnetic green compact after being performed with the curing. In this case, when the total amount of the polyamide system resin and the PPS resin is determined to be 100 percent, the amount of the PPS resin is varied to be 0 percent, 25 percent, 50 percent, 62.5 percent, 75 percent, and 100 percent. As shown in FIG. 10, there is the tendency that the effective permeability of the test piece is declined as the total resin amount is increased. It is because the ratio of the soft magnetic iron system powdered particles is declined. Thus, when the soft magnetic powder material is determined to be 100 percent, it is preferable to determine the total resin amount to be less than 1.5 wt percent, and more particularly, to be less than 1.0 wt percent.

Figure 11:
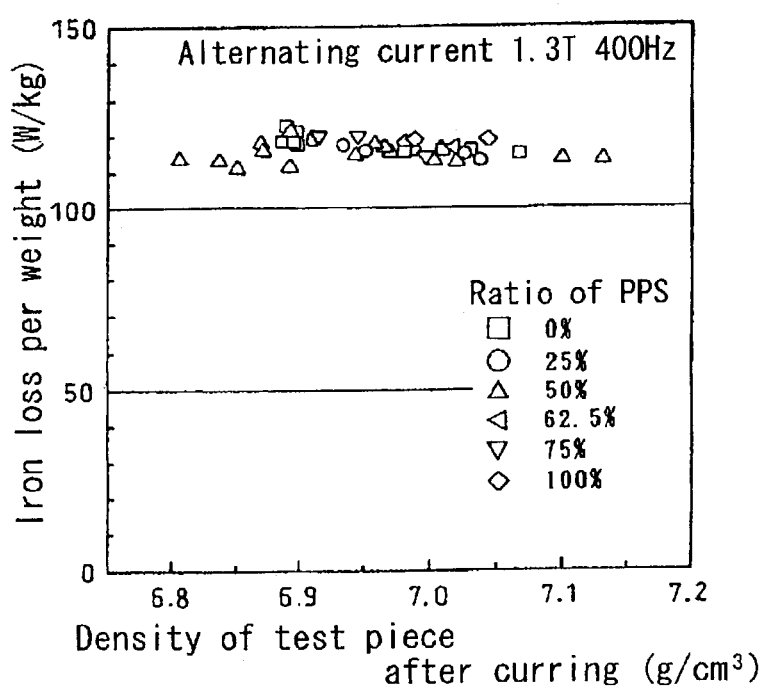
FIG. 11 is a graph showing a relationship between the density of the test piece after the curing and an iron loss per weight of the test piece.

The iron loss per weight will be explained referring to FIG. 11. The horizontal axis of FIG. 11 shows the density of the test piece corresponding to the soft magnetic green compact after being performed with the curing. The vertical axis of FIG. 11 shows the iron loss per weight. In this case, when the total resin amount is determined to be 100 percent, the ratio of the PPS resin in the total resin amount is varied to be 0 percent, 25 percent, 62.5 percent, 75 percent, and 100 percent. With this experiment, the measurement is performed under the state that the alternating-current magnetic field (i.e., 1.3 T) is generated by energizing the alternating current of 400 Hz to the toroidal coil. The total resin amount is determined within the 0.4–0.8 wt percent. The iron loss per weight (w/kg) is the total of the eddy current loss and the hysteresis loss. As shown in FIG. 11, the iron loss is not very influenced even when the density of the test piece is varied by the variation of the ratio of the polyamide system resin and the PPS resin.

As explained above, by controlling the mount of the PPS resin and the polyamide system resin in accordance with the required characteristics of the soft magnetic green compact, the soft magnetic powder green compact which has high strength under the high temperature environment, the favorable electric characteristics (i.e., resistivity), the favorable magnetic characteristic, and which is easily ejected from the cavity of the die can be obtained.

Figure 12:
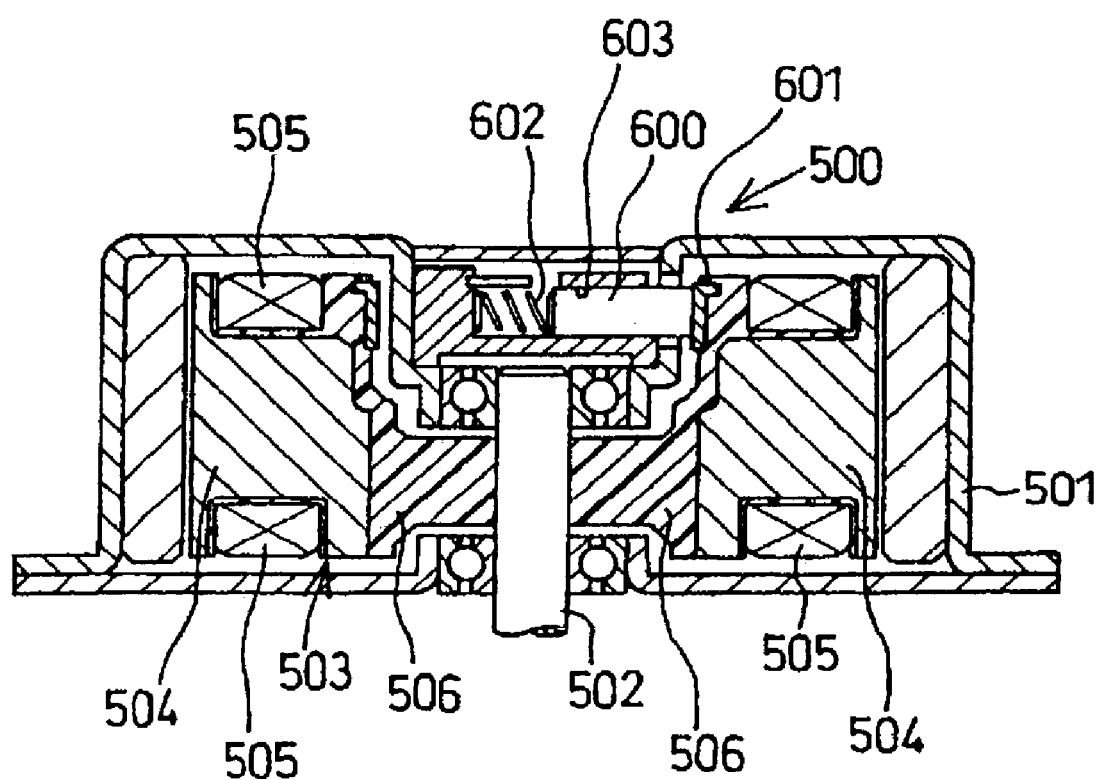
FIG. 12 is a cross sectional view of a motor applied with a core including the soft magnetic powder material according to the embodiment of the present invention.

FIG. 12 shows an example for applying the magnetic green compact formed in the foregoing manner to the brush motor (i.e., electromagnetic actuator). A brush motor 500 includes a case 501, a shaft 502 rotaratably provided on the case 501 functioning as an operation portion, and an armature 503 supported by the shaft 502. The armature 503 includes a core 504 for forming a magnetic path, an armature coil 505 supported by the core 504 for generating magnetic filed lines, and a supporting portion for supporting the core 504 relative to the shaft portion 502. A brush 600 under a biased state by a coil spring 602 is supported by a brush holder 603 so that the brush 600 contacts from the internal side to the external side relative to a brush contact portion 601. When the shaft 502 is rotated, the centrifugal force affects the core 504. This motor may be used under the high temperature condition such as in the engine room. When this motor is applied to the vehicle, not only the centrifugal force but also the vehicle oscillation affects the core 504.

The core 504 corresponds to the magnetic path forming member for forming a magnetic path loop, formed with the soft magnetic green compact of the embodiment, and includes the high strength under the high temperature environment. Even when the core 504 is used under the state that the centrifugal force and the oscillation affect the core 504 under the high temperature environment, the strength of the core 504 can be sufficiently ensured.

Because the core 504 is formed with the soft magnetic green compact according to the embodiment, the core 504 includes the effects that the removability of the green compact ejected from the die such as the metal die becomes favorable and the magnetic characteristic (i.e., permeability, saturation flux density) and the electric characteristic (i.e., resistivity) can strike the balance at high level. The soft magnetic powder material and the soft magnetic green compact applied with the soft magnetic powder material of the embodiment of the present invention can be applied to not only to the brush motor but also to other motors and other electromagnetic actuators.

With the embodiment of the present invention, the soft magnetic powder material, the soft magnetic green compact applied with the soft magnetic powder material, and the manufacturing method of the soft magnetic green compact include the high strength under the high temperature condition, include the favorable removability of the green compact from the die, and strike the balance between the magnetic characteristic (i.e., permeability, saturation flux density) and the electric characteristic (i.e., resistivity) at high level.

In particular, with the manufacturing method for performing the first step for forming the green compact by pressurizing the soft magnetic powder material and the second step for heating the green compact in this order, the removability of the green compact from the die in the first step can be favorably ensured, the productivity is improved, and is advantageous to increasing the quality of the soft magnetic green compact because the application of the lubricant to the cavity surface of the die and the mixture of the lubricant in the soft magnetic powder material can be reduced or avoided.

When the thermoplastic resin having the melting point of equal to or higher than 200° C. corresponds to polyphenylene sulfide system resin, it is advantageous to ensure the strength of the soft magnetic green compact when the soft magnetic green compact is used under the high temperature environment. Further, when the soft magnetic powdered material is determined to be 100 percent and the total of the polyamide system resin and the thermoplastic resin having the melting point of equal to or higher than 200° C. is determined as the total resin amount, the 0.1–3.0 wt percent of the total resin amount achieve the appropriate ratio of the resin constituent relative to the iron system powdered particles. In this case, the strength under the high temperature environment can be improved, the removability of the green compact from the die can be improved, and the magnetic characteristic and the electric characteristic can be balanced at high level.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A soft magnetic powder material comprising:
   an iron system powdered particle having an insulating coat;
   a polyamide system resin; and
   a thermoplastic resin having a melting point equal to or higher than 200° C., wherein
   an average particle diameter of the thermoplastic resin having a melting point equal to or higher than 200° C. is greater than an average particle diameter of the polyamide system resin; and
   an average particle diameter of the iron system powdered particle is greater than the average particle diameter of the thermoplastic resin having a melting point equal to or higher than 200° C.

2. A soft magnetic powder material according to claim 1, wherein the thermoplastic resin having the melting point equal to or higher than 200° C. includes a polyphenylene sulfide system resin.

3. A soft magnetic powder material according to claim 1, wherein the polyamide system resin and the thermoplastic resin having the melting point equal to or higher than 200° C. together amount to 0.1–3.0 weight percent of the soft magnetic powder material.

4. A soft magnetic powder material according to claim 1, wherein
   the polyamide system resin is 1 to 99 weight percent of the polyamide system resin and the thermoplastic resin having the melting point equal to or higher than 200° C.; and
   the thermoplastic resin having the melting point equal to or higher than 200° C. is 1 to 99 weight percent of the polyamide system resin and the thermoplastic resin having the melting point equal to or higher than 200° C.

5. A soft magnetic powder material according to claim 1, wherein the iron system powdered particle includes equal to or greater than 90 weight percent of iron.

6. A soft magnetic powder material according to claim 1, wherein the iron system powdered particle has a non-spherical shape with irregular concave or convex portions.

7. A soft magnetic powder material according to claim 1, wherein the polyamide system resin is 20 to 80 weight percent of the polyamide system resin and the thermoplastic resin having a melting point equal to or higher than 200° C.

8. A soft magnetic green compact formed by pressurizing and heating a soft magnetic powder material comprising
   an iron system powdered particle having an insulating coat;
   a polyamide system resin; and
   a thermoplastic resin having a melting point equal to or higher than 200° C., wherein
   an average particle diameter of the thermoplastic resin having a melting point equal to or higher than 200° C. is greater than an average particle diameter of the polyamide system resin; and
   the iron system powdered particle has a non-spherical shape with irregular concave or convex portions.

9. A soft magnetic green compact according to claim 8, wherein the soft magnetic green compact is used in an engine room.

10. A soft magnetic green compact according to claim 8, wherein the soft magnetic green compact serves as a magnetic path forming member.

11. A method of manufacturing a soft magnetic green compact, the method comprising steps of
    forming a green compact by pressurizing a soft magnetic powder material comprising
      an iron system powdered particle having an insulating coat,
      a polyamide system resin, and
      a thermoplastic resin having a melting point equal to or higher than 200° C., wherein
      an average particle diameter of the thermoplastic resin having a melting point equal to or high than 200° C. is greater than an average particle diameter of the polyamide system resin, and
      an average particle diameter of the iron system powdered particle is greater than the average particle diameter of the thermoplastic resin having a melting point equal to or higher than 200° C.; and
    heating the green compact.

12. A soft magnetic green compact according to claim 8, wherein
    an average particle diameter of the iron system powdered particle is greater than the average particle diameter of the thermoplastic resin having a melting point equal to or higher than 200° C.

* * * * *